March 24, 1970  D. J. MARY  3,502,388
OPTICAL DELAY LINE WITH IMAGE PRESERVATION
Filed March 1, 1968
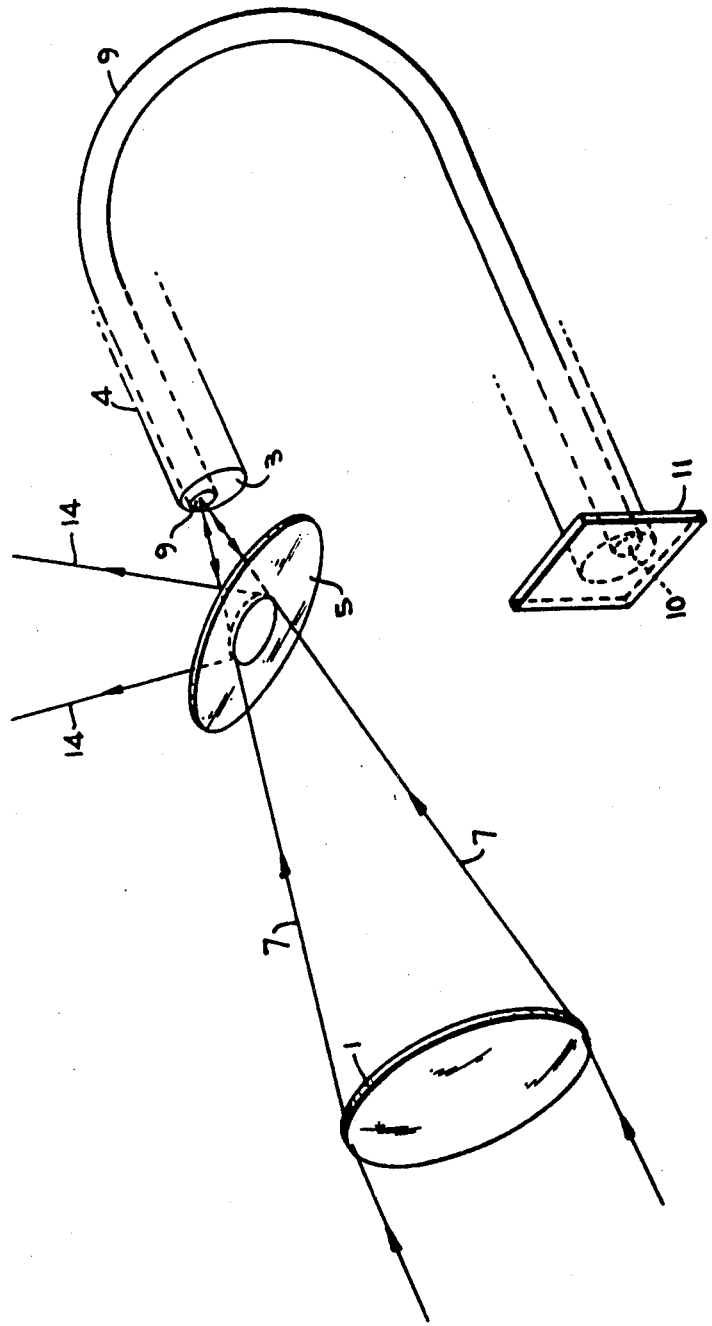
INVENTOR,
DONALD J. MARY
ATTORNEYS

United States Patent Office 3,502,388
Patented Mar. 24, 1970

3,502,388
OPTICAL DELAY LINE WITH IMAGE PRESERVATION
Donald J. Mary, Hyattsville, Md., assignor to the United States of America as represented by the Secretary of the Army
Filed Mar. 1, 1968, Ser. No. 709,645
Int. Cl. G02b 5/16
U.S. Cl. 350—96               3 Claims

ABSTRACT OF THE DISCLOSURE

A delay line for preserving an optical image having an incoherent fiber optical bundle which is arranged with one end in the plane of the image. Each fiber transmits the light from the portion of the image that falls upon it and after traveling the length of the fiber the light is reflected by a mirror in optical contact with the far end of the bundle. The reflected light reverses itself and travels back along the same fiber. The image emerging from the input end of the fiber bundle is deflected by a beam splitter.

---

The invention described herein may be manufactured, used, and licensed by or for the Government for governmental purposes without the payment to me of any royalty thereon.

BACKGROUND OF THE INVENTION

In certain optical applications it is necessary to have a delay in the transit time of light from one point to another. For example, such an optical delay device would be necessary in the design of certain types of eye safety apparatus for protection against laser radiation.

Previously, methods of delaying light involved passing light back and forth between arrays of mirrors. In such cases the delay is proportional to the number of times the light is reflected and the mirror separation. Where large delays are required, many mirrors would be needed and/or their separation must be great.

In applications where a scene or image is to be delayed (as opposed to a narrow, collimated light beam) the mirrors would have to be made increasingly larger. Large mirror size would be needed in such cases to assure that all the light entering the delay system would pass through with no vignetting. These delay systems using mirror separation all have the disadvantage of being expensive and cumbersome to handle. Large linear distances are needed to establish the mirror separation and alignment is a critical factor in such systems.

It is therefore an object of this invention to provide an optical delay line which is compact, rugged, and requires no critical alignment of its components.

An additional object of this invention is to provide an optical delay line which will delay an optical image and is simple and inexpensive to construct.

A further object of this invention is to provide an optical delay line which will preserve the information contained in the original optical image.

SUMMARY OF THE INVENTION

The image to be delayed enters an incoherent fiber optical bundle, arranged with one end in the plane of the image. Each fiber in the bundle collects the light from the portion of the image that falls upon it and transmits the light along the length of the fiber. The light is reflected by a mirror in optical contact with the far end of the bundle and the reflected light reverses itself and travels back along the same fiber to the input end of the bundle. Here, the emerging light is separated from the original input image by a beam splitter.

BRIEF DESCRIPTION OF THE DRAWING

The figure is a diagram of an optical delay line arranged in accordance with my invention.

DESCRIPTION OF THE PREFERRED EMBODIMENT

The optical delay line shown in the figure has a lens 1 to focus the light rays 7 onto the entrance face 3 of the fiber optical bundle 4. A beam splitter 5 is located between the lens 1 and the entrance face 3. For purposes of clarity the light rays 7 forming only one element of the image are indicated in the figure. Rays forming other elements in the image would behave in a similar manner. The fiber bundle 4 is a group of individual fibers (one of which, fiber 9, is greatly exaggerated in the figure) and has an input face 3 and an output face 10. The mirror 11 makes optical contact with the end 10 (of the fibers in bundle 4) and is situated to reflect the light back into the fiber bundle.

As shown in the figure, the light rays 7 fall on the fiber 9 in the bundle 4 and after entering fiber 9 the rays will be transmitted the length of the fiber and emerge at face 10. Mirror 11, which is an optical contact with the bundle, reflects the light back into the fiber and the light will travel back through the fiber and emerge at face 3. The rays emerging from the fiber optic bundle 4 at end 3 will be deflected by the beam splitter 5 and travel along the lines shown at 14. The delay time of the emerging light which is separated from the original input image by the beam splitter is equal to the ratio of the refractive indices of the fiber material and air times twice the length of the bundle divided by the velocity of light in air.

It should also be realized that instead of mirror 11 it would be possible to replace the mirror by directly coating the output face of fiber bundle 4 with a mirror surface. Such a mirror surface would serve the same reflective function as the mirror 11.

From the foregoing disclosure and the drawing, skilled persons will readily understand that the original optical image being delayed is also preserved in shape upon its emergence from face 3. This is obviously due to the fact that each portion of the original and reflected image traverses the same fiber in both directions and thus, regardless of the orientation of the fibers at face 10, the separate portions of the image will reconverge at face 3 to duplicate the original image.

It will be apparent that the embodiment shown is only exemplary and that various modifications can be made in construction and arrangement within the scope of the invention as defined in the appended claims.

I claim as my invention:
1. A optical delay line comprising, in combination, means for projecting an optical image upon a first end of an incoherent optical fiber bundle, each fiber in said incoherent optical fiber bundle adapted to collect the light from the portion of said optical image that falls upon it and to transmit said optical image in a forward direction within the bundle, and reflecting means in optical contact with a second end of said incoherent optical fiber bundle for reflecting said optical image in a reverse direction and causing each portion of said optical image to traverse the same optic fiber in both directions, whereby the original information of said optical image is preserved upon its emergence from said first end of said incoherent optical fiber bundle, and optical separating means to separate the incoming optical image from the reflected optical image emerging from the said incoherent optical fiber bundle.

2. The invention according to claim 1 wherein said reflecting means comprises a mirror surface coated upon said second end of said incoherent optical fiber bundle.

3. The invention according to claim 1 wherein said separating means comprises an optical beam splitter placed adjacent to said first end of said incoherent optical fiber bundle.

References Cited

UNITED STATES PATENTS

| | | | |
|---|---|---|---|
| 3,163,767 | 12/1964 | Witt et al. | 350—96 X |
| 3,273,447 | 9/1966 | Frank | 350—96 |
| 3,273,458 | 9/1966 | Kohler. | |
| 3,327,584 | 6/1967 | Kissinger | 350—96 X |

DAVID H. RUBIN, Primary Examiner

U.S. Cl. X.R.

350—202